US012020837B2

(12) United States Patent
Kido et al.

(10) Patent No.: US 12,020,837 B2
(45) Date of Patent: Jun. 25, 2024

(54) LAMINATED INDUCTOR COMPONENT

(71) Applicant: Murata Manufacturing Co., Ltd., Kyoto-fu (JP)

(72) Inventors: Tomohiro Kido, Nagaokakyo (JP); Shimpei Tanabe, Nagaokakyo (JP); Yoshiyuki Oota, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/296,848

(22) Filed: Apr. 6, 2023

(65) Prior Publication Data

US 2023/0253139 A1 Aug. 10, 2023

Related U.S. Application Data

(63) Continuation of application No. 16/205,057, filed on Nov. 29, 2018, now Pat. No. 11,657,945.

(30) Foreign Application Priority Data

Dec. 14, 2017 (JP) ................................ 2017-240004

(51) Int. Cl.
*H01F 17/00* (2006.01)
*H01F 17/02* (2006.01)
(Continued)

(52) U.S. Cl.
CPC ......... *H01F 17/0013* (2013.01); *H01F 17/02* (2013.01); *H01F 27/29* (2013.01);
(Continued)

(58) Field of Classification Search
CPC ...... H01F 17/0013; H01F 17/02; H01F 27/29; H01F 27/323; H01F 41/043; H01F 41/122
See application file for complete search history.

(56) References Cited

U.S. PATENT DOCUMENTS

2009/0153282 A1 6/2009 Taoka et al.
2010/0328009 A1 12/2010 Tawa
(Continued)

FOREIGN PATENT DOCUMENTS

CN 106816259 A 6/2017
JP 5821535 B2 11/2015
JP 2017-076733 A 4/2017

OTHER PUBLICATIONS

An Office Action; "Notification of Reasons for Refusal," mailed by the Japanese Patent Office on Feb. 18, 2020, which corresponds to Japanese Patent Application No. 2017-240004 and is related to U.S. Appl. No. 16/205,057 with English language translation.
(Continued)

*Primary Examiner* — Malcolm Barnes
(74) *Attorney, Agent, or Firm* — Studebaker & Brackett PC

(57) ABSTRACT

A laminated inductor component includes a multilayer body which includes a first side surface, a second side surface and a bottom surface, and in which a plurality of insulator layers is laminated in a lamination direction; a coil conductor in helical form including a plurality of coil conductor layers wound on the insulator layers, and having a coil length parallel to the lamination direction; a first outer conductor electrically connected to a first end of the coil conductor and exposed from the first side surface and the bottom surface in the multilayer body; and a second outer conductor electrically connected to a second end of the coil conductor and exposed from the second side surface and the bottom surface in the multilayer body. A width along the lamination direction of each of the first outer conductor and the second outer conductor is shorter than the coil length.

11 Claims, 6 Drawing Sheets

(51) Int. Cl.
*H01F 27/29* (2006.01)
*H01F 27/32* (2006.01)
*H01F 41/04* (2006.01)
*H01F 41/12* (2006.01)

(52) U.S. Cl.
CPC ......... *H01F 27/323* (2013.01); *H01F 41/043* (2013.01); *H01F 41/122* (2013.01)

(56) References Cited

U.S. PATENT DOCUMENTS

| | | | | |
|---|---|---|---|---|
| 2013/0162382 | A1 | 6/2013 | Cha et al. | |
| 2013/0169401 | A1 | 7/2013 | Lee et al. | |
| 2013/0187480 | A1 | 7/2013 | Hiei | |
| 2013/0214888 | A1* | 8/2013 | Nogi | H01F 27/29 336/192 |
| 2015/0287514 | A1* | 10/2015 | Lim | H01F 17/0033 336/200 |
| 2015/0294779 | A1* | 10/2015 | Lim | H01F 27/292 336/192 |
| 2015/0371753 | A1 | 12/2015 | Lee | |
| 2016/0012961 | A1 | 1/2016 | Suzuki et al. | |
| 2017/0110234 | A1* | 4/2017 | Nishikawa | H01F 41/0206 |
| 2018/0182536 | A1* | 6/2018 | Tachibana | H01G 4/232 |
| 2018/0294090 | A1* | 10/2018 | Nishikawa | H01F 17/0033 |
| 2019/0035534 | A1* | 1/2019 | Suzuki | H01F 27/2804 |
| 2021/0272741 | A1 | 9/2021 | Rottner et al. | |

OTHER PUBLICATIONS

An Office Action mailed by the China National Intellectual Property Administration on Jul. 7, 2020, which corresponds to Chinese Patent Application No. 201811382715.2 and is related to U.S. Appl. No. 16/205,057 with English language translation.

* cited by examiner

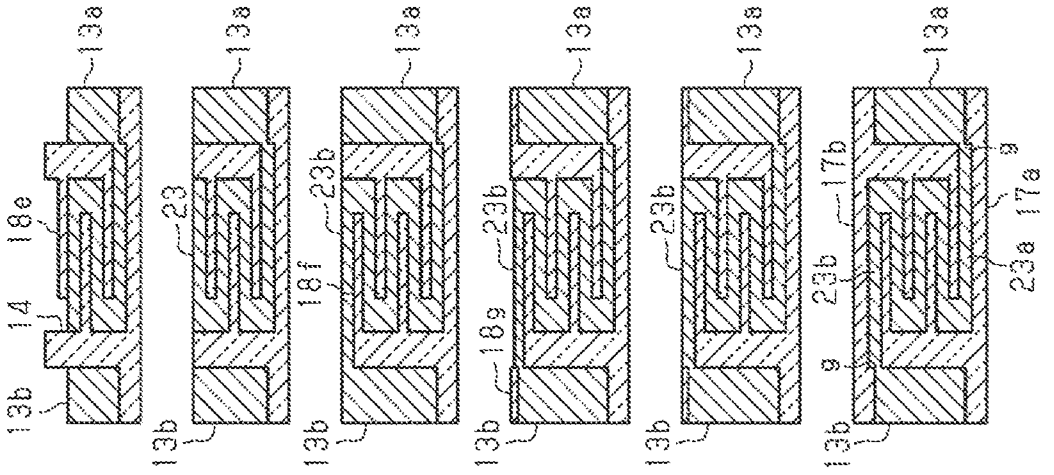
FIG. 2L
FIG. 2M
FIG. 2N
FIG. 2O
FIG. 2P
FIG. 2Q
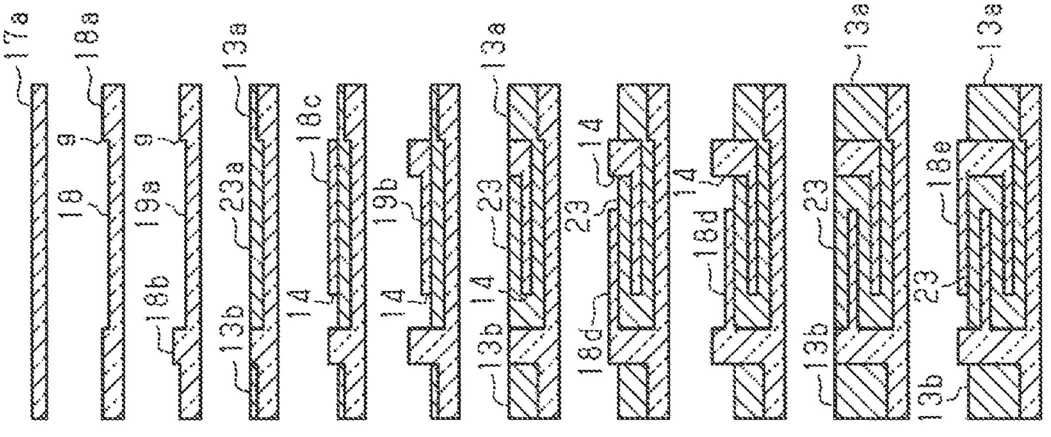
FIG. 2A
FIG. 2B
FIG. 2C
FIG. 2D
FIG. 2E
FIG. 2F
FIG. 2G
FIG. 2H
FIG. 2I
FIG. 2J
FIG. 2K

LAMINATED INDUCTOR COMPONENT

CROSS-REFERENCE TO RELATED APPLICATION

This application is a Continuation of U.S. patent application Ser. No. 16/205,057 filed Nov. 29, 2018, which claims benefit of priority to Japanese Patent Application No. 2017-240004, filed Dec. 14, 2017, the entire content of which is incorporated herein by reference.

BACKGROUND

Technical Field

The present disclosure relates to a laminated inductor component including a plurality of coil conductor layers disposed on a plurality of laminated insulator layers.

Background Art

Japanese Patent No. 5821535 discloses, as a laminated inductor having a high quality factor (Q factor). The laminated inductor includes a plurality of coil conductor layers (inner conductor layers) wound on an insulator layer in a multilayer body, and provided with a helical coil conductor (coil structure) having a coil length parallel to the lamination direction and an L-shaped outer conductor exposed from a side surface and a bottom surface (a mounting substrate surface) of the multilayer body, where the coil length is parallel (in a lateral direction) with respect to the bottom surface and the side surface. Note that “coil length” refers to a coil conductor length along a direction in which the helical coil conductor extends while being wound. Alternatively, “coil length” may be a coil conductor length along a winding center line (coil axis) of the helical coil conductor.

FIG. 7 is a cross-sectional view illustrating the laminated inductor of Japanese Patent No. 5821535, and represents a cross section parallel to a bottom surface. In the laminated inductor of Japanese Patent No. 5821535, a first outer conductor 3*a* and a second outer conductor 3*b* are respectively exposed from a first side surface 5*a* and a second side surface 5*b* opposing each other. The first outer conductor 3*a* and the second outer conductor 3*b* are also exposed from the bottom surface (not illustrated). A multilayer body 2 is laminated in a lamination direction L (an up-down direction in FIG. 7) along the first side surface 5*a*, the second side surface 5*b*, and the bottom surface; a main surface on an outer side portion of an outermost layer 6*a* and a main surface on an outer side portion of an outermost layer 6*b* of the multilayer body 2 constitute a third side surface 7*a* and a fourth side surface 7*b*, respectively, of the multilayer body 2.

A coil conductor 1 has a coil length CL parallel to the lamination direction L. The first outer conductor 3*a* and the second outer conductor 3*b* are covered with a metal layer 4 which is plating of nickel Ni and tin Sn, and constitute an outer electrode 8.

SUMMARY

In the laminated inductor component of FIG. 7, it is conceivable to increase an aspect ratio of a coil conductor layer 9 in order to further enhance the Q factor. In this case, the thickness of the coil conductor layer 9 (length along the lamination direction L in a cross section of the coil conductor layer 9) increases. However, in a case where it is attempted to achieve this increase without changing an outer shape dimension of the multilayer body 2, since the rate of the coil length CL of the coil conductor 1 in the multilayer body 2 increases, a thickness “a” of each of the outermost layers 6*a* and 6*b* of the multilayer body 2 becomes small, as illustrated in FIG. 8.

Note that, since the coil conductor layer 9, the first outer conductor 3*a*, and the second outer conductor 3*b* are usually formed on the same insulation layer, the width of each of the first outer conductor 3*a* and the second outer conductor 3*b* along the lamination direction L is equal to the coil length CL, and the thickness of each of the outermost layers 6*a* and 6*b* positioned respectively above and below the first outer conductor 3*a* and the second outer conductor 3*b* is equal to “a”. Under this state, in a case where the metal layer 4 is formed on the first outer conductor 3*a* and the second outer conductor 3*b*, there is a high possibility that the metal layer 4 is extended from the first side surface 5*a*, the second side surface 5*b*, and the bottom surface of the multilayer body 2 onto the third side surface 7*a* side or the fourth side surface 7*b* side.

In the case where the metal layer 4 extends onto the third side surface 7*a* side or the fourth side surface 7*b* side, a variation in an outer diameter dimension along the lamination direction L of the laminated inductor increases. Thus, for example, a problem that the mounting device fails to correctly take out the laminated inductor from the packaging material in the mounting process is likely to occur, thereby making it difficult to smoothly mount the laminated inductor. Alternatively, such a problem is likely to occur that the laminated inductor is in contact with or to be short-circuited with a component mounted adjacent to the laminated inductor on the lamination direction L side on the mounting substrate.

Further, even in a case where the metal layer 4 does not extend onto the third side surface 7*a* side or the fourth side surface 7*b* side, mounting solder that adheres to the metal layer 4 at the time of mounting may extend onto the third side surface 7*a* side or the fourth side surface 7*b* side. Due to this, the mounting solder may cause a trouble of making contact with or being short-circuited with a component mounted adjacent to the laminated inductor on the lamination direction L side on the mounting substrate. In other words, a variation in a substantial outer shape dimension with the attached mounting solder of the laminated inductor increases.

Further, as illustrated in FIG. 9, even in a case where the first outer conductor 3*a* and the second outer conductor 3*b* are not formed, and an extended electrode 10 continued from an end portion of the coil conductor 1 is exposed to the first side surface 5*a* and the second side surface 5*b* of the multilayer body 2, by increasing the aspect ratio without changing the outer shape dimension of the multilayer body 2, a distance from an exposed position of the extended electrode 10 to the third side surface 7*a* or the fourth side surface 7*b*, that is, the thickness of the outermost layer 6*a* or 6*b* of the multilayer body 2 is reduced. As a result, in the case where the metal layer 4 is so formed as to cover the exposed portion of the extended electrode 10, the mounting solder is attached to the metal layer 4, or the like, similar problems to those illustrated in FIG. 8 are likely to occur.

In view of the foregoing, the present disclosure provides a laminated inductor component capable of reducing a variation in the substantial outer shape dimension.

An aspect of a laminated inductor component includes a multilayer body which includes a first side surface and a second side surface opposing each other, and a bottom surface connecting the first side surface and the second side surface, and in which a plurality of insulator layers is laminated in a lamination direction along the first side surface, the second side surface, and the bottom surface. The laminated inductor component further includes a coil conductor in helical form including a plurality of coil conductor layers wound on the insulator layers, and having a coil length parallel to the lamination direction; a first outer conductor electrically connected to a first end of the coil conductor and exposed from the first side surface and the bottom surface in the multilayer body; and a second outer conductor electrically connected to a second end of the coil conductor and exposed from the second side surface and the bottom surface in the multilayer body. A width along the lamination direction of each of the first outer conductor and the second outer conductor is shorter than the coil length.

This configuration suppresses a situation in which the metal layer covering the first outer conductor and the second outer conductor or the mounting solder attached thereto extend onto the side surface on the lamination direction side of the multilayer body.

In addition, in the above-described laminated inductor component, it is preferable that, when viewed from a direction orthogonal to the first side surface, an end portion of the first outer conductor on the first end side in the lamination direction overlap with part of the coil conductor layer to be an outermost layer on the first end side. With this configuration, since it is possible to simultaneously form the end portion of the first outer conductor and part of the coil conductor layer overlapping with each other on the first end side, dimensional accuracy of a width along the lamination direction of the first outer conductor is enhanced with respect to the coil length of the coil conductor.

Meanwhile, in the laminated inductor component, it is preferable that, when viewed from the direction orthogonal to the first side surface, an end portion of the first outer conductor on the second end side in the lamination direction overlap with part of the coil conductor layer to be an outermost layer on the second end side. With this configuration, since it is possible to simultaneously form the end portion of the first outer conductor and part of the coil conductor layer overlapping with each other on the second end side, the dimensional accuracy of the width along the lamination direction of the first outer conductor is further enhanced with respect to the coil length of the coil conductor.

In addition, in the laminated inductor component, it is preferable that the stated laminated inductor component further include an extended electrode connecting the first end and the first outer conductor, and that a thickness on the first end side of the extended electrode be greater than a thickness on the first outer conductor side of the extended electrode. Further, it is preferable that a step having a different thickness be formed on the extended electrode. This configuration makes it possible to easily shorten the width along the lamination direction of the first outer conductor compared to the coil length.

In addition, in the laminated inductor component, it is preferable that a line width of the extended electrode be wider than a line width of the coil conductor layer. With this configuration, reduction in a cross-sectional area of the extended electrode is canceled, and an increase in local electric resistance in the extended electrode can be suppressed.

Another aspect of a laminated inductor component includes a multilayer body which includes a first side surface and a second side surface opposing each other, and a bottom surface connecting the first side surface and the second side surface, and in which a plurality of insulator layers is laminated in a lamination direction along the first side surface, the second side surface, and the bottom surface. The laminated inductor component further includes a coil conductor in helical form including a plurality of coil conductor layers wound on the insulator layers, and having a coil length parallel to the lamination direction; a first outer conductor electrically connected to a first end of the coil conductor and exposed from the first side surface and the bottom surface in the multilayer body; and a second outer conductor electrically connected to a second end of the coil conductor and exposed from the second side surface and the bottom surface in the multilayer body. Both ends in the lamination direction of the first outer conductor and the second outer conductor are positioned on an inner side relative to both ends in the lamination direction of the coil conductor.

This configuration suppresses a situation in which the metal layer covering the first outer conductor and the second outer conductor, the mounting solder attached thereto, and the like extend onto the side surface on the lamination direction side of the multilayer body.

Another aspect of the laminated inductor component includes a multilayer body which includes a first side surface and a second side surface opposing each other, and a bottom surface connecting the first side surface and the second side surface, and in which a plurality of insulator layers is laminated in a lamination direction along the first side surface, the second side surface, and the bottom surface. The laminated inductor component further includes a coil conductor in helical form including a plurality of coil conductor layers wound on the insulator layers, and having a coil length parallel to the lamination direction; a first outer conductor electrically connected to a first end of the coil conductor and exposed from the bottom surface in the multilayer body; and a second outer conductor electrically connected to a second end of the coil conductor and exposed from the bottom surface in the multilayer body. A width along the lamination direction of each of the first outer conductor and the second outer conductor is shorter than the coil length.

This configuration suppresses a situation in which the metal layer covering the first outer conductor and the second outer conductor, the mounting solder attached thereto, and the like extend onto the side surface on the lamination direction side of the multilayer body.

In addition, in the laminated inductor component, it is preferable that the stated laminated inductor component further include a metal layer covering the first outer conductor, and that both ends in the lamination direction of the metal layer be positioned in the bottom surface. With this configuration, the metal layer does not extend onto the side surface on the lamination direction side of the multilayer body, and a situation in which the mounting solder attached to the metal layer extends onto the side surface on the lamination direction side of the multilayer body can be further suppressed.

Other features, elements, characteristics and advantages of the present disclosure will become more apparent from the following detailed description (with reference to the attached drawings).

BRIEF DESCRIPTION OF THE DRAWINGS

FIGS. 2A to 2Q are explanatory diagrams illustrating a lamination process of a laminated inductor component;

DETAILED DESCRIPTION

Hereinafter, an embodiment as an aspect of the present disclosure will be described with reference to the accompanying drawings.

Figure 1:
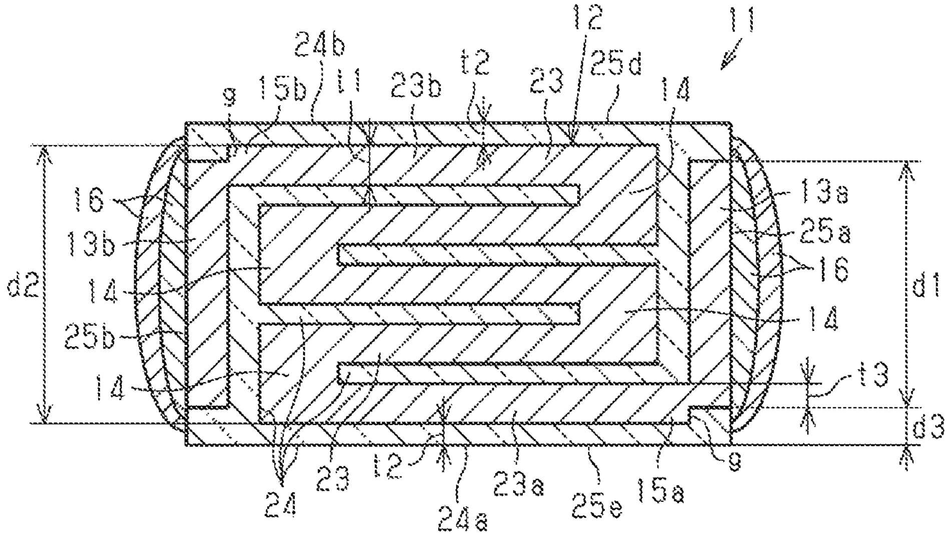
FIG. 1 is a cross-sectional view illustrating a laminated inductor component.
Figure 5:
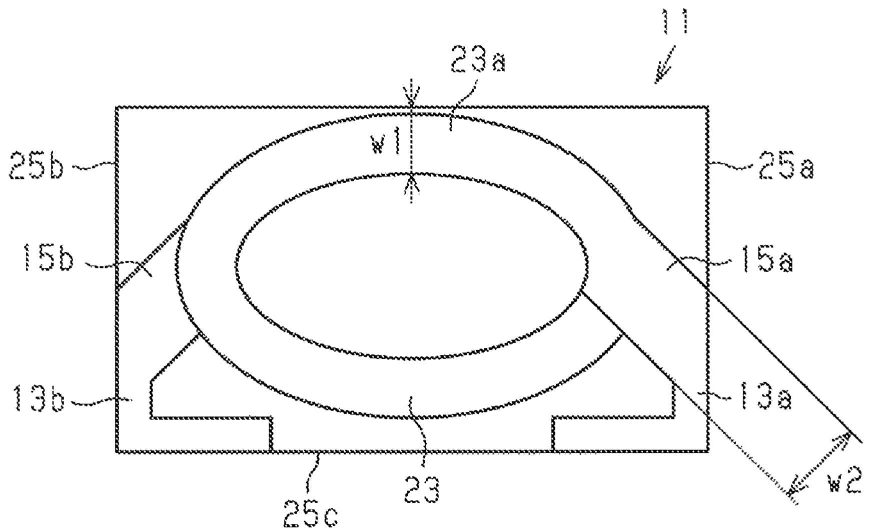
FIG. 5 is a front view illustrating a laminated inductor component.

In a laminated inductor component of the present embodiment illustrated in FIGS. 1 and 5, a plurality of coil conductor layers 23 and a plurality of insulator layers 24 are laminated by repeating, for example, a screen printing process and a photolithography process, thereby constituting a substantially rectangular parallelepiped multilayer body 11 including a first side surface 25*a* and a second side surface 25*b* opposing each other, and a bottom surface 25*c* connecting the first side surface 25*a* and the second side surface 25*b*. Further, there are provided a third side surface 25*d* and a fourth side surface 25*e* opposing each other in a direction orthogonal to a direction in which the first side surface 25*a* and the second side surface 25*b* oppose each other.

Each coil conductor layer 23 is electrically connected through a via 14 passing through the insulator layer 24 to configure a coil conductor 12 in helical form. In outermost layers 23*a* and 23*b* of the coil conductor layer 23, a first outer conductor 13*a* exposed to the first side surface 25*a* is connected to a first end of the coil conductor 12, which is an end portion of one outermost layer, that is, the outermost layer 23*a*. Further, a second outer conductor 13*b* exposed to the second side surface 25*b* is connected to a second end of the coil conductor 12, which is an end portion of the other outermost layer, that is, the outermost layer 23*b*.

The first outer conductor 13*a* and the second outer conductor 13*b* are laminated in parallel with the lamination of the coil conductor layers 23 in a lamination process of the coil conductor layers 23. The first end of the coil conductor 12 is connected to the first outer conductor 13*a* via an extended electrode 15*a*, and the second end of the coil conductor 12 is connected to the second outer conductor 13*b* via an extended electrode 15*b*.

In order to increase the aspect ratio, a thickness t1 of the coil conductor layer 23 in the lamination direction (up-down direction in FIG. 1) along the first side surface 25*a* and the second side surface 25*b* is sufficiently secured, and is thicker than a thickness t2 of each of outermost layers 24*a* and 24*b* of the insulator layer 24. Widths of the first and second outer conductors 13*a* and 13*b* along the lamination direction have the same width, that is, a width d1, which is shorter than a coil length d2 of the coil conductor 12. In other words, a step g is interposed between the outermost layer 23*a* of the coil conductor layer 23 and the first outer conductor 13*a*, and an end portion in the lamination direction of the first outer conductor 13*a* is positioned on an inner side in the lamination direction relative to the outermost layer 23*a* of the coil conductor layer 23. Accordingly, the width d1 of the first outer conductor 13*a* is shorter in the lamination direction than the coil length d2 of the coil conductor 12.

Similarly, another step g is interposed between the outermost layer 23*b* of the coil conductor layer 23 and the second outer conductor 13*b*, and an end portion in the lamination direction of the second outer conductor 13*b* is so formed as to be positioned on an inner side in the lamination direction relative to the outermost layer 23*b* of the coil conductor layer 23. Accordingly, the width of the second outer conductor 13*b* is shorter in the lamination direction than the coil length d2 of the coil conductor 12.

Further, since the width d1 of each of the first outer conductor 13*a* and the second outer conductor 13*b* is shorter than the coil length d2, a distance d3 between the third side surface 25*d* and the end portion in the lamination direction of each of the first outer conductor 13*a* and the second outer conductor 13*b* is greater than the thickness t2 of the outermost layer 24*b* of the insulator layer 24. Also, a distance d3 between the fourth side surface 25*e* and the end portion in the lamination direction of each of the first outer conductor 13*a* and the second outer conductor 13*b* is greater than the thickness t2 of the outermost layer 24*a* of the insulator layer 24. With this configuration, when viewed from a direction orthogonal to the first side surface 25*a* or the second side surface 25*b*, both the end portions in the lamination direction of each of the first outer conductor 13*a* and the second outer conductor 13*b* overlap with part of each of the outermost layers 23*a* and 23*b* of the coil conductor layer 23.

As illustrated in FIG. 1, a metal layer 16 plated with, for example, nickel Ni and tin Sn is formed on the first outer conductor 13*a* exposed to the first side surface 25*a* and the second outer conductor 13*b* exposed to the second side surface 25*b*. The metal layer 16 may be formed of silver Ag, copper Cu, lead Pd, gold Au, or the like. Further, the insulator layer 24 is formed of a ceramic material such as glass, ferrite or alumina, or a resin, etc., and the coil conductor 12 is formed of a good conductor such as silver Ag, copper Cu, or gold Au.

As described above, since the width d1 of each of the first outer conductor 13*a* and the second outer conductor 13*b* is formed to be shorter than the coil length d2, the metal layer 16 is accommodated within the first side surface 25*a* and the second side surface 25*b*, and therefore, the metal layer 16 is unlikely to extend onto the third side surface 25*d* and the fourth side surface 25*e*.

Next, a manufacturing process of the laminated inductor component of the present embodiment will be described with reference to FIGS. 2A to 2Q.

As illustrated in FIG. 2A, by repeating a process in which an insulating paste containing borosilicate glass as the main ingredient is applied onto a carrier film (not illustrated) by screen printing, an insulator layer 17*a* for an outer layer having an appropriate thickness is formed.

Next, as illustrated in FIG. 2B, a photosensitive insulating paste is applied onto the insulator layer 17*a* for the outer layer by screen printing, and an insulating paste layer 18*a* including an opening 18 is formed by a photolithography process. The opening 18 is a portion where the insulating paste layer 18*a* is removed and the insulator layer 17*a* for the outer layer is exposed, and the portion other than the opening 18 is a portion where the insulating paste layer 18*a* remains. A step g is formed at an end portion of the opening 18.

Next, as illustrated in FIG. 2C, by the application of the photosensitive insulating paste and the photolithography process, a bank portion 18*b* is formed by laminating an insulating paste layer at only one side of the opening 18 in a predetermined range, and a groove 19*a* is formed between the bank portion 18*b* and the step g.

Note that the bank portion 18*b* may be formed by removing part of the insulating paste layer 18*a* without depending on only the lamination of the insulating paste layer. As for the shape of the groove 19*a*, a step on the bank portion 18*b* side is formed to be high relative to the opening 18, and the bank portion 18*b* is a base portion at a time when the insulator layer 24 is laminated.

Next, as illustrated in FIG. 2D, the groove 19*a* is filled with the photosensitive conductive paste layer to be the outermost layer 23*a* of the coil conductor layer 23 and the first and second outer conductors 13*a* and 13*b*, by the screen printing and the photolithography process.

Next, as illustrated in FIG. 2E, an insulating paste layer 18*c* including the via 14 is formed, and as illustrated in FIG. 2F, a groove 19*b* for forming the coil conductor layer 23 and the first and second outer conductors 13*a* and 13*b* is formed.

Thus, as illustrated in FIGS. 2G to 2N, by laminating the insulating paste layer and the conductive paste layer in sequence, the insulating paste layer 18*a* to an insulating paste layer 18*f*, the coil conductor layer 23, and the first and second outer conductors 13*a* and 13*b* are laminated.

Then, as illustrated in FIGS. 2N to 2P, the outermost layer 23*b* of the coil conductor layer 23 is so formed as to include the step g, and as illustrated in FIG. 2Q, an insulator layer 17*b* for an outer layer is further formed, whereby the outermost layer 24*b* of the insulator layer 24 is formed along the step g.

The lamination process illustrated in FIGS. 2A to 2Q is described for one laminated inductor component. However, in practice, a large number of laminated inductor components may be manufactured as a mother multilayer body in which the stated laminated inductor components are arranged in matrix form.

In this case, the mother multilayer body is cut with a dicing machine into individual multilayer bodies 11 each including a single coil conductor 12, and thereafter the individual multilayer bodies 11 are fired. Then, after barrel finishing is performed on the multilayer body 11, by the outer conductors 13*a* and 13*b* of the multilayer body 11 being plated with the metal layer 16, the laminated inductor component including the coil conductor 12 is formed inside the multilayer body 11.

Figure 3:
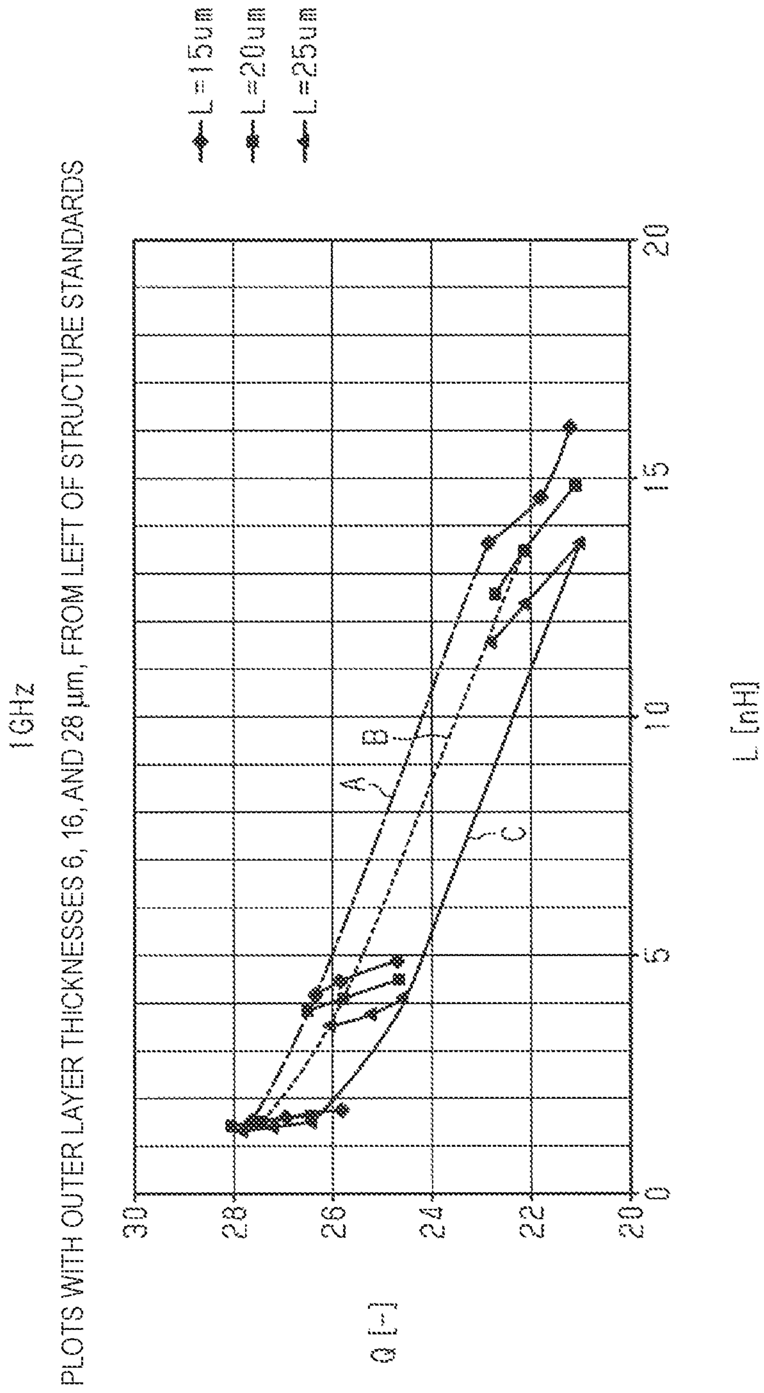
FIG. 3 is an explanatory diagram showing a transition of a Q factor based on changes in an outer layer thickness and a line width of a coil conductor.

FIG. 3 shows a change in a Q factor with respect to an input signal of about 1 GHz, when the thickness t2 of each of the outermost layers 24*a* and 24*b* of the insulator layer 24 and the line width of the coil conductor layer 23 are changed in the laminated inductor component constituted as described above. In this figure, a characteristics line A shows a case where the thickness t2 of each of the outermost layers 24*a* and 24*b* is about 6 μm and the line width of the coil conductor layer 23 is about 15 μm, a characteristics line B shows a case where the thickness t2 is about 16 μm and the line width of the coil conductor layer 23 is about 20 μm, and a characteristics line C shows a case where the thickness t2 is about 28 μm and the line width of the coil conductor layer 23 is about 25 μm.

As shown in FIG. 3, when the thickness t2 is reduced, it is possible to increase the aspect ratio of the coil conductor 12 within a limited outer shape size of the multilayer body 11 and to improve the Q factor.

Next, action of the laminated inductor component of the present embodiment constituted as described above will be described.

In the laminated inductor component of the present embodiment, the thickness t1 of the coil conductor layer 23 is increased, so that the resistance of the coil conductor 12 is reduced. In particular, since a high-frequency signal flowing through the coil conductor 12 mainly passes through an inner diameter side surface of the coil conductor 12, when the thickness t1 of the coil conductor layer 23 increases, alternating current resistance (Rac) decreases. Therefore, the Q factor of the laminated inductor component is improved.

Here, as the thickness t1 of the coil conductor layer 23 increases, the coil length d2 increases; however, the width d1 of each of the outer conductors 13*a* and 13*b* is shorter than the coil length d2. Therefore, the metal layer 16, with which the surfaces of the outer conductors 13*a* and 13*b* are plated, does not extend onto the third side surface 25*d* and the fourth side surface 25*e* of the multilayer body 11. As a result, generation of a variation in the outer diameter dimension of the laminated inductor component is suppressed. Further, since the metal layer 16 does not extend onto the third side surface 25*d* and the fourth side surface 25*e* of the multilayer body 11, a range in which the passage of magnetic flux is prevented is reduced, and efficiency in obtaining inductance in the laminated inductor component is improved.

Note that the first and second outer conductors 13*a* and 13*b* are formed being laminated through the same process as the lamination process of the coil conductor layer 23 and the outermost layers 23*a* and 23*b* thereof. Therefore, dimensional accuracy of positioning of the first and second outer conductors 13*a* and 13*b* in the lamination direction is improved with respect to the coil conductor layer 23 and the outermost layers 23*a* and 23*b* thereof. Accordingly, dimensional accuracy of the width d1 of each of the first and second outer conductors 13*a* and 13*b* as well as the step g is improved.

With the laminated inductor component constituted as described above, the following effects can be obtained.

(1) Since the width d1 of each of the first and second outer conductors 13*a* and 13*b* is made shorter than the coil length d2 of the coil conductor 12, it is possible to prevent the metal layer 16, with which the first and second outer conductors 13*a* and 13*b* are plated, from extending onto the third side surface 25*d* and the fourth side surface 25*e*. Accordingly, it is possible to suppress the variation in the outer diameter dimension of the multilayer body 11 incorporating the inductor formed of the coil conductor 12, and to smoothly mount the multilayer body 11 to the mounting position by the mounting device in the mounting process, and to prevent the occurrence of short circuit with an adjacently mounted component.

(2) By making the distances d3 between both the end portions in the lamination direction of the first and second outer conductors 13*a*, 13*b* and the third and fourth side surfaces 25*d*, 25*e* be greater than the thicknesses t2 of the outermost layers 24*a* and 24*b* of the insulator layer 24, it is possible to increase the aspect ratio of the coil conductor layer 23 without increasing the outer shape of the multilayer body 11. Accordingly, it is possible to reduce the resistance of the coil conductor 12 and to improve the Q factor of the inductor formed of the coil conductor 12.

(3) Since it is possible to prevent the metal layer 16, with which the first and second outer conductors 13*a* and 13*b* are plated, from extending onto the third side surface 25*d* and the fourth side surface 25*e*, efficiency in obtaining the inductance can be enhanced.

(4) Since the first and second outer conductors 13*a* and 13*b* can be formed being laminated through the same process as the lamination process of the coil conductor 12, the positional accuracy of each of the first and second outer conductors 13*a* and 13*b* with respect to the coil conductor 12 can be enhanced. Further, in comparison with a case where the first and second outer conductors 13*a* and 13*b* are formed in different processes, the number of processes can be decreased.

The above embodiment may be modified as follows.

Figure 4A:
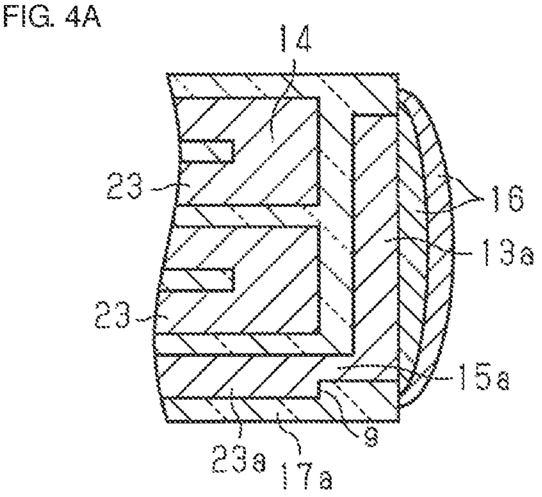
FIGS. 4A to 4C are cross-sectional views illustrating variations.
Figure 6A:
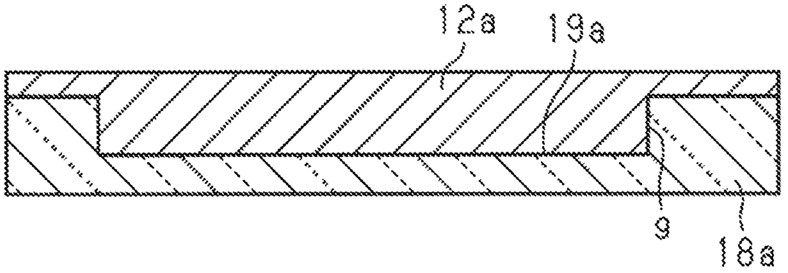
FIGS. 6A and 6B are explanatory diagrams illustrating a production method for a step.

As illustrated in FIG. 4A, the steps g may be formed not at the connection portions between the first and second outer conductors 13*a*, 13*b* and the extended electrodes 15*a*, 15*b*, but at the connection portions between the outermost layers 23*a*, 23*b* of the coil conductor layer 23 and the extended electrodes 15*a*, 15*b*. Like in the above-described embodiment, these steps g can be formed in the process illustrated in FIG. 6A. In this case, by forming the steps g, the thickness in the lamination direction of each of the extended electrodes 15*a* and 15*b* is thinner than the thickness of each of the outermost layers 23*a* and 23*b* of the coil conductor layer 23.

As such, as illustrated in FIG. 5, it is preferable that a line width w2 of each of the extended electrodes 15*a* and 15*b* be formed wider than a line width w1 of the coil conductor layer 23, and that the cross-sectional area of each of the extended electrodes 15*a* and 15*b* be formed equal to or larger than that of the outermost layers 23*a* and 23*b* of the coil conductor layer 23 respectively. Thus, an increase in resistance at each of the portions of the extended electrodes 15*a* and 15*b* can be suppressed.

Figure 4B:
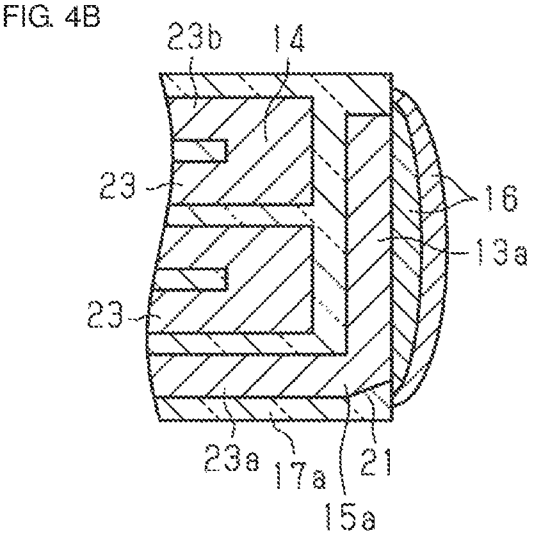

As illustrated in FIG. 4B, at the connection portions between the extended electrodes 15*a*, 15*b* and the first and second outer conductors 13*a*, 13*b*, by forming slopes 21, as the steps, at end portions in a longitudinal direction of the first and second outer conductors 13*a* and 13*b*, the width of each of the first and second outer conductors 13*a* and 13*b* along the lamination direction may be configured to be shorter than the coil length.

Figure 4C:
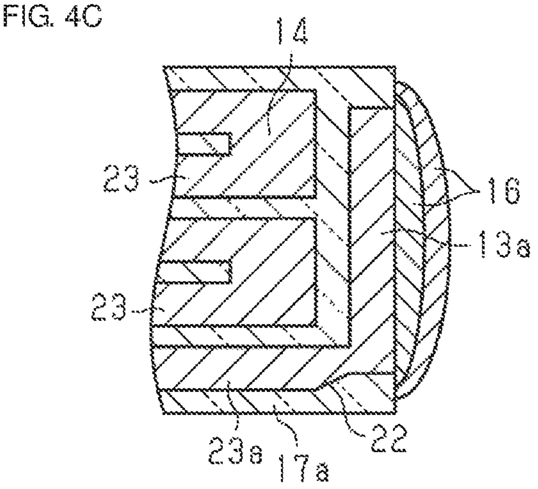

As illustrated in FIG. 4C, at the connection portions between the extended electrodes 15*a*, 15*b* and the first and second outer conductors 13*a*, 13*b*, by forming slopes 22, as the steps, on the extended electrodes 15*a* and 15*b*, the width of each of the outer conductors 13*a* and 13*b* along the lamination direction may be configured to be shorter than the coil length.

Figure 6B:
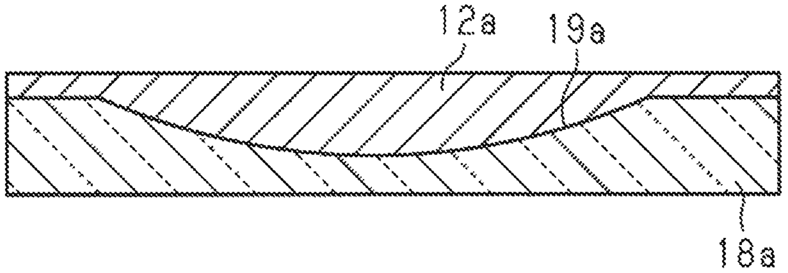
Figure 7:
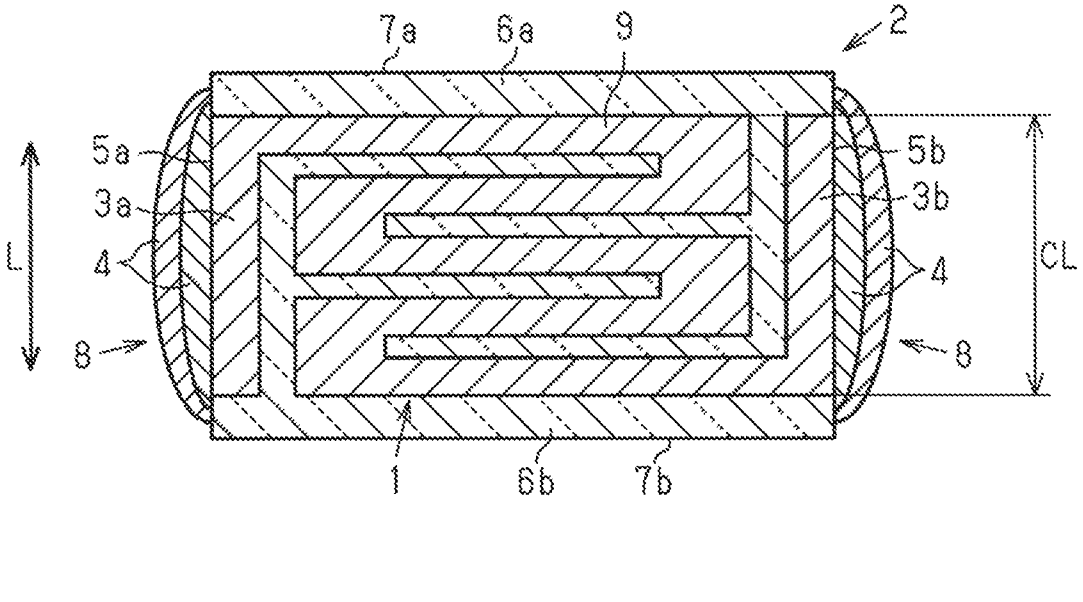
FIG. 7 PRIOR ART
FIG. 7 is a cross-sectional view illustrating an existing laminated inductor component.
Figure 8:
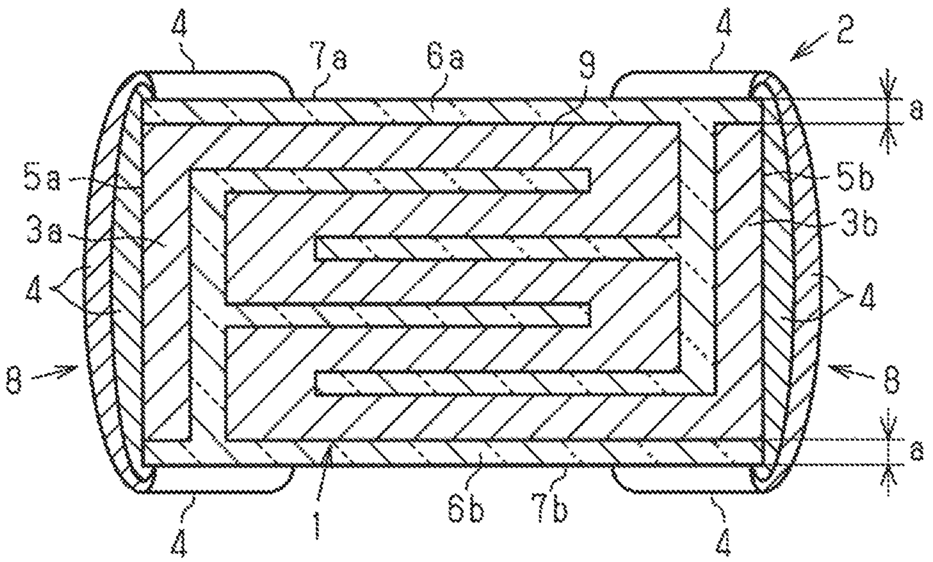
FIG. 8 PRIOR ART
FIG. 8 is a cross-sectional view illustrating an existing laminated inductor component.
Figure 9:
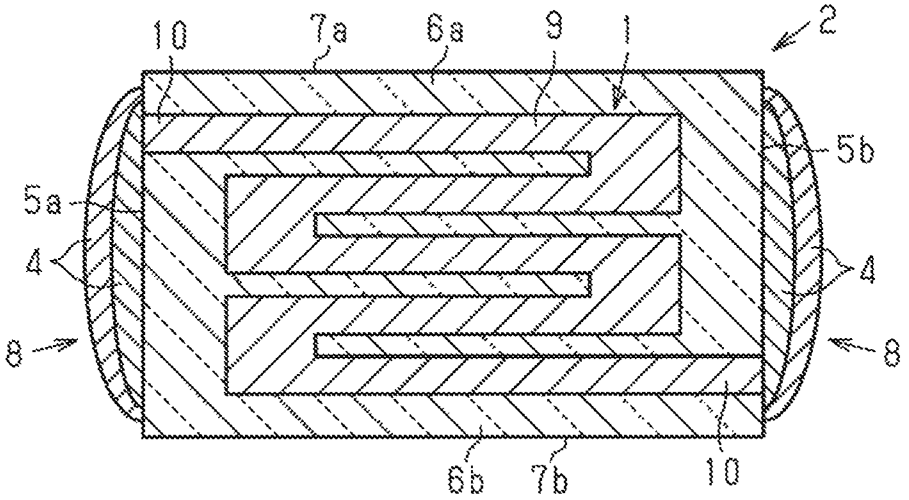
FIG. 9 PRIOR ART
FIG. 9 is a cross-sectional view illustrating an existing laminated inductor component.

The slopes 21 and 22 illustrated in FIGS. 4B and 4C can be formed in the process illustrated in FIG. 2B, for example, by changing the thickness of the insulating paste 18*a* to be applied at an end portion of the groove 19*a*, as illustrated in FIG. 6B, by a pattern printing method with a screen mask where used is the screen mask in which only a portion for forming the step is open. Alternatively, at the end portion of the groove 19*a*, the above-mentioned slope may be formed by increasing the number of times of application. According to these methods, the step is formed at the end portion of the groove 19*a*, and the insulating paste flows from a thicker application-thickness portion toward a thinner application-thickness portion of the insulating paste layer 18*a* to form the slope.

The step g and the slopes 21, 22 as illustrated in FIGS. 4A to 4C may be formed by half-etching while adjusting an exposure amount, a development time, and an amount of etching in a photolithography process.

The manufacturing process of the laminated inductor component of the present embodiment is merely an example, and other known methods may be used. For example, the layer may be formed by spin coating or spray coating, or may be patterned by laser processing or drilling. Further, a sheet lamination method, a printing lamination method, or the like may be used.

The metal layer is not limited to a layer formed by plating, and may be a resin electrode or a metal layer formed by sputtering.

In the embodiment, although the width d1 is made shorter than the coil length d2 by the lamination process, the width d1 of each of the first outer conductor 13*a* and the second outer conductor 13*b* may be formed to be shorter than the coil length d2 by, for example, a pressing process in the sheet lamination method.

The multilayer body 11 may have a mounting area of "0201", i.e., about 0.2 mm×about 0.1 mm, or "0402", "0603", "1005" or the like. The above-discussed embodiment is particularly useful in a case of forming a multilayer body having a size of equal to or smaller than "0402".

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A laminated inductor component comprising:

a multilayer body which includes a first side surface and a second side surface opposing each other, a bottom surface connecting the first side surface and the second side surface, and a third side surface and a fourth side surface opposing each other in a direction orthogonal to a direction in which the first side surface and the second side surface oppose each other, and in which a plurality of insulator layers is laminated in a lamination direction along the first side surface, the second side surface, and the bottom surface;

a coil conductor in helical form including a plurality of coil conductor layers wound on the insulator layers;

a first outer conductor electrically connected to a first end of the coil conductor and exposed from the first side surface and the bottom surface in the multilayer body; and a second outer conductor electrically connected to a second end of the coil conductor and exposed from the second side surface and the bottom surface in the multilayer body, a distance between a flat surface of the third side surface and an end portion in the lamination direction of the first outer conductor is greater than a distance between the flat surface of the third side surface and an end portion in the lamination direction of the coil conductor.

2. The laminated inductor component according to claim 1, wherein a distance between the flat surface of the third side surface and an end portion in the lamination direction of the second outer conductor is greater than a distance between the flat surface of the third side surface and an end portion in the lamination direction of the coil conductor.

3. The laminated inductor component according to claim 1, wherein a distance between a flat surface of the fourth side surface and an end portion in the lamination direction of the first outer conductor is greater than a distance between the flat surface of the third side surface and an end portion in the lamination direction of the coil conductor.

4. The laminated inductor component according to claim 1, wherein a distance between a flat surface of the fourth side surface and an end portion in the lamination direction of the second outer conductor is greater than a distance between the flat surface of the third side surface and an end portion in the lamination direction of the coil conductor.

5. The laminated inductor component according to claim 1, wherein the coil conductor has a coil length parallel to the lamination direction, and wherein a width along the lamination direction of each of the first outer conductor and the second outer conductor is shorter than the coil length.

6. The laminated inductor component according to claim 1, wherein when viewed from a direction orthogonal to the first side surface, an end portion of the first outer conductor on a first end side in the lamination direction overlaps with part of the coil conductor layer to be an outermost layer on the first end side.

7. The laminated inductor component according to claim 6, wherein when viewed from the direction orthogonal to the first side surface, an end portion of the first outer conductor on a second end side in the lamination direction overlaps with part of the coil conductor layer to be an outermost layer on the second end side.

8. The laminated inductor component according to claim 6, further comprising:

an extended electrode connecting the first end and the first outer conductor, wherein a thickness on the first end side of the extended electrode is greater than a thickness on the first outer conductor side of the extended electrode.

9. The laminated inductor component according to claim 8, wherein a step having a different thickness is formed on the extended electrode.

10. The laminated inductor component according to claim 8, wherein a line width of the extended electrode is wider than a line width of the coil conductor layer.

11. The laminated inductor component according to claim 1, further comprising:

a metal layer covering the first outer conductor, wherein both ends in the lamination direction of the metal layer are positioned in the first side surface.

* * * * *